United States Patent
Lim et al.

(10) Patent No.: US 10,554,324 B1
(45) Date of Patent: Feb. 4, 2020

(54) DYNAMIC WAVELENGTH ALLOCATION IN OPTICAL NETWORKS

(71) Applicant: Twitch Interactive, Inc., San Francisco, CA (US)

(72) Inventors: Gary Lim, Greenwood Village, CO (US); Eric Cables, San Mateo, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 16/118,988

(22) Filed: Aug. 31, 2018

(51) Int. Cl.
*H04J 14/02* (2006.01)
*H04B 10/27* (2013.01)

(52) U.S. Cl.
CPC .......... *H04J 14/0242* (2013.01); *H04B 10/27* (2013.01)

(58) Field of Classification Search
CPC .......................... H04J 14/0242; H04B 10/27
See application file for complete search history.

(56) References Cited

U.S. PATENT DOCUMENTS

| | | | | |
|---|---|---|---|---|
| 8,687,976 | B1* | 4/2014 | Sindhu | H04B 10/27 398/168 |
| 9,832,166 | B1* | 11/2017 | Butler | H04L 61/2007 |
| 2015/0180603 | A1* | 6/2015 | Darling | H04J 14/0212 398/49 |
| 2016/0344507 | A1* | 11/2016 | Marquardt | H04J 14/0227 |
| 2017/0005728 | A1* | 1/2017 | Wang | H04B 10/272 |
| 2018/0367214 | A1* | 12/2018 | Woodward | H04B 10/2507 |
| 2019/0200104 | A1* | 6/2019 | Xiao | H04Q 11/0005 |
| 2019/0207702 | A1* | 7/2019 | van Veen | H04B 10/27 |

* cited by examiner

*Primary Examiner* — Mina M Shalaby
(74) *Attorney, Agent, or Firm* — Kilpatrick Townsend & Stockton LLP

(57) ABSTRACT

Techniques for dynamically identifying an optical path to utilize in an optical network in response to a bandwidth request are disclosed herein. In embodiments, router port information, IP address information, and optical transponder information may be obtained by a network controller system from a router controller. An optical network path and a particular wavelength may be obtained from a CDC node controller. The network controller system may instruct an optical transponder controller to configure an optical transponder in the optical network path to utilize the particular wavelength based on obtaining the optical network path. The network controller system may instruct the router controller to configure router ports for one or more routers to utilize the IP address information and the router port information based at least in part on the instructing of the optical transponder controller to configure the optical transponder.

20 Claims, 11 Drawing Sheets

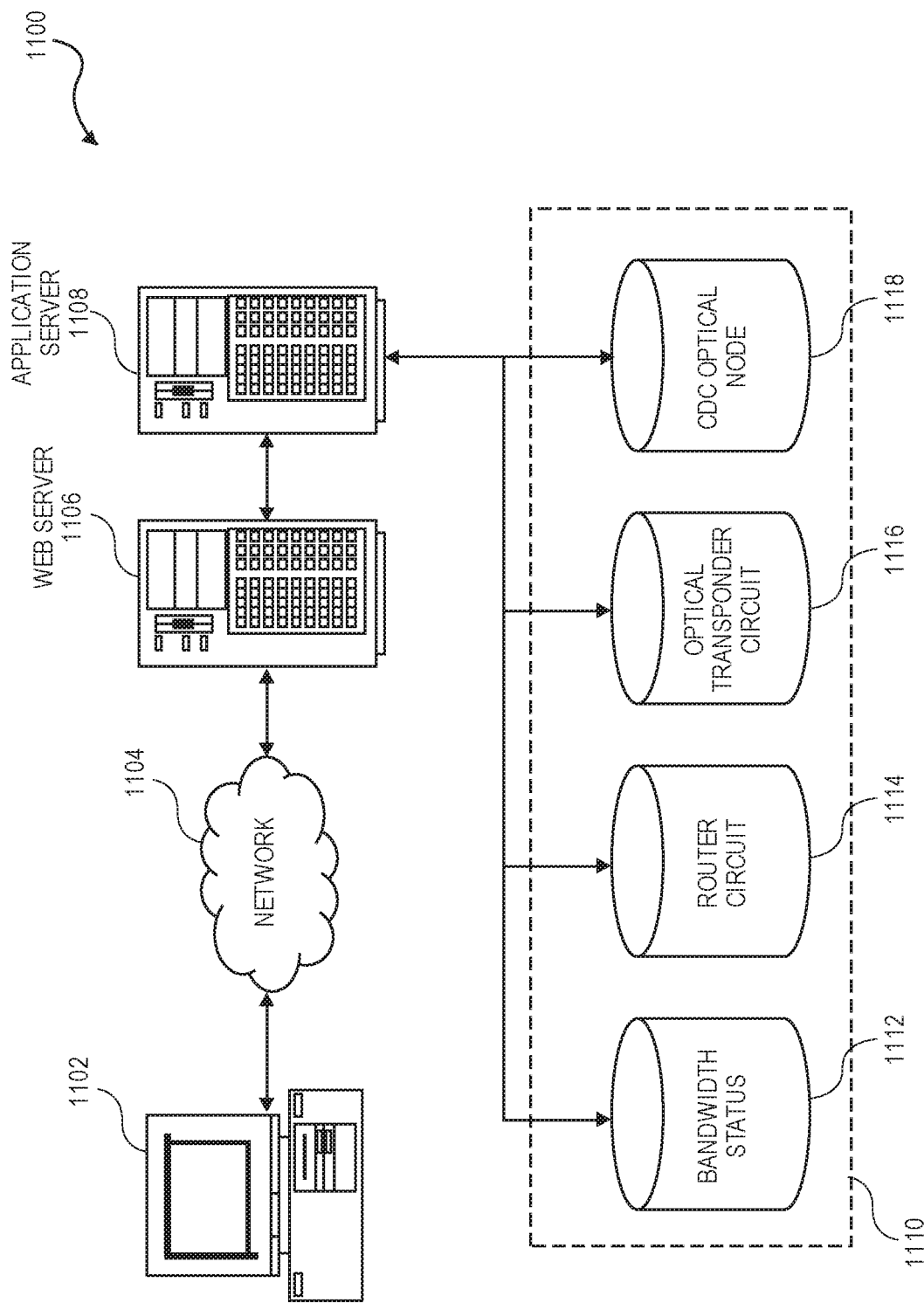

US 10,554,324 B1

DYNAMIC WAVELENGTH ALLOCATION IN OPTICAL NETWORKS

BACKGROUND

As an increasing number of applications and services such as streaming content services are being made available over networks such as the internet, service providers are facing ever increasing network bandwidth issues. As the amount of traffic to view, consume, or otherwise interact with the streaming content increases, there is a need to improve the efficiency with which demands for increased network bandwidth can be met by service providers. Existing systems and networks may utilize manual solutions, which may take days to weeks, to identify available paths, ports, and test paths through a network to form a channel. Such solutions are not only costly as valuable bandwidth requests are left unanswered and service providers lose customers, profit, etc., but some bandwidth requests may be temporary and/or short term. In cases where bandwidth requests coincide with events and/or don't follow a known pattern networks which are expanded to include more resources to meet such a requests may be left underutilized thus resulting in even more loss for the service provider.

BRIEF DESCRIPTION OF THE DRAWINGS

Various embodiments in accordance with the present disclosure will be described with reference to the drawings, in which:

FIG. 11 illustrates an environment in which various embodiments can be implemented.

DETAILED DESCRIPTION

Figure 1:
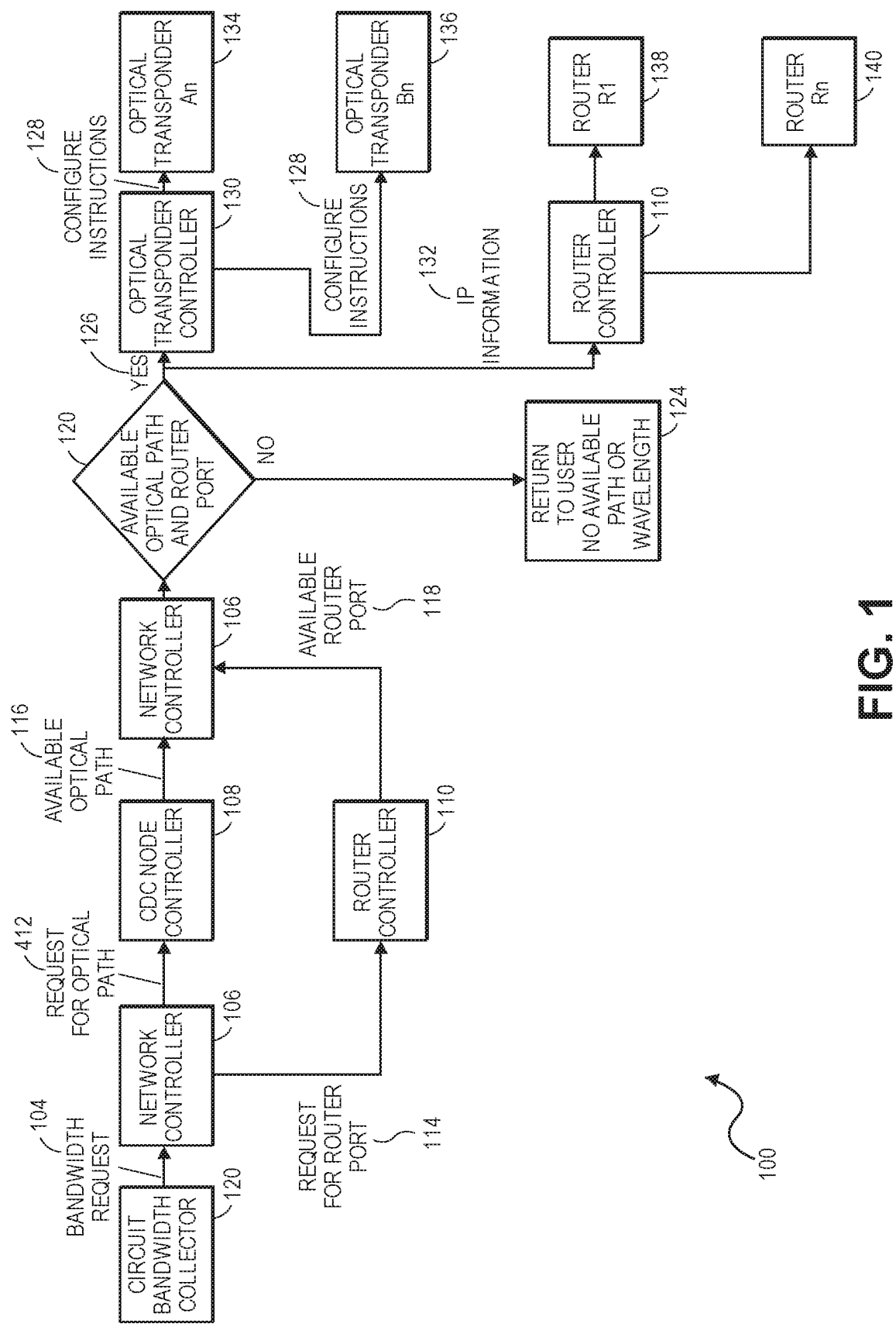
FIG. 1 depicts an example workflow for an optical wavelength allocation feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for an optical wavelength allocation feature for automatically determining and provisioning router/switch (routers) ports and optical transponder wavelengths for generating an end to end channel between one or more routers in a colorless-directionless-contentionless (CDC) optical network based on bandwidth demand from the one or more routers in the CDC optical network. In embodiments, the directionless term for the CDC optical network refers to the ability to route a wavelength across any viable path in the network. In embodiments, the colorless term for the CDC optical network refers to an ability to receive any suitable wavelength on any suitable port in the network. The term contentionless in the CDC optical network refers to an ability to eliminate wavelength blocking, allowing for the ability to add/drop a duplicate wavelength onto a single mux/demux (multiple-input to single-output/single-input to multiple-output). In accordance with at least one embodiment, a network controller system (CDC controller component), which may be a computer, a server computer, a network of computers, or virtual machines implemented in a hosted computing environment, may implement the optical wavelength allocation feature described herein and be in communication with one or more other systems of a CDC optical network (optical network) described herein with reference to FIGS. 1-8. In embodiments, the network controller system may identify a free router ports on one or more routers in the optical network and their associated optical transponders based on a bandwidth request associated with the one or more routers.

The network controller system may identify an optical path and a wavelength for between CDC optical nodes associated with the one or more routers of the optical network to utilize to form an end to end channel between the one or more routers based on information obtained by the other systems of the optical network. In accordance with at least one embodiment, the network controller system may provision the target wavelength on the associated optical transponders and execute the optical path build between the associated CDC optical nodes associated with the one or more routers of the optical network. The network controller system may configure the free router ports to enable increased bandwidth capacity between the one or more routers. For example, an initial bandwidth capacity between router R1 and R2 of an optical network may be limited to a 100 Gigabit/s capacity. Upon executing the optical wavelength allocation feature described herein, an additional optical path that provides another 100 Gigabit/s capacity may be provisioned and implemented thereby doubling the available bandwidth capacity between routers that require additional bandwidth capacity in the optical network. In accordance with at least one embodiment, the optical wavelength allocation feature implemented by the network controller system may dynamically allocate and deallocate or otherwise release capacity as needed by routers in the optical network.

For example, routers R1 and R2 of the optical network may require additional network bandwidth to handle traffic related to a spontaneous event (e.g., a large multi-player video game tournament hosted by a streaming content provider). As described herein, the optical wavelength allocation feature implemented by the network controller system may provision additional bandwidth capacity by identifying and configuring the appropriate components to provide the additional requested bandwidth. However, once the event ends and the additional bandwidth is no longer required between routers R1 and R2, the network controller system may release or otherwise deallocate utilized optical transponders and wavelengths such that the same wavelengths and optical transponders can be utilized to satisfy other bandwidth requests from other routers in the optical network (e.g., to generate new optical paths in the optical network).

In accordance with at least one embodiment, the network control system may maintain one or more thresholds. For example, a threshold may be maintained that indicates when bandwidth capacity has been reached and initiates the provisioning of additional bandwidth between routers of the optical network. As an illustrative example, a first bandwidth capacity may be set at 90% indicating that when one or more routers bandwidth capacity reaches 90% or more the network control system will provision additional bandwidth capacity for said routers. The one or more thresholds maintained may also include thresholds associated with release capacity. For example, a threshold may be maintained that indicates when bandwidth capacity has fallen below a certain threshold that the network controller system can release or otherwise reallocate the bandwidth capacity for other routers in the optical network. As an illustrative example, a second bandwidth capacity may be set at 30% indicating that when one or more routers additional bandwidth capacity falls below 30% the network control system will free up, release, or otherwise reallocate components in the optical network to provide additional bandwidth to other routers in the optical network. In accordance with at least one embodiment, as the optical network grows (e.g., more components such as hardware components are added to the optical network), the network control system is configured to scale and generate new and different optical paths between routers of the optical network. For example, based on the routers in the optical network that require additional bandwidth and the resources available (e.g., non-utilized optical transponders and available wavelengths), the network control system may identify an optical path that may not be the shortest route, thereby introducing a small amount of latency, in the optical network to satisfy bandwidth requests. However, the generated optical route and the introduced latency will still serve to transport data at a faster speed than conventional systems which require days to weeks to install, test, and implement additional channels for bandwidth request.

The processes and systems described herein may be an improvement on conventional bandwidth allocation mechanisms. For example, conventional identification and implementation of bandwidth capacity in response to bandwidth request include manual identification and implementation that can take up to days or weeks to fully implement, long after the bandwidth request would need to be met. For example, a network administrator associated with a router team may need to identify that additional bandwidth is required and make a request to an optical network provisioning team. The optical network provisioning team must manually identify the best available path and ports required to satisfy the bandwidth request. Once the optical network provisioning team has identified the path and ports, it must then implement configurations and tests to make sure the paths and ports will work to satisfy the request. After testing this information is provided back to the router team which must then configure the router ports for connectivity and perform more tests. The methods and systems described herein provide for more efficient identification and implementation of bandwidth capacity in an optical network. As described herein, components of the optical wavelength allocation feature in the optical network may identify when routers require bandwidth, identify available optical transponders and an optical path to form and end to end channel, and configure the routers and optical transponders to satisfy the bandwidth request. Moreover, the optical wavelength allocation feature can release or reallocate components in the optical network to satisfy other bandwidth requests from routers of the optical network thereby maximizing usage of the components without forming channels that lay stagnant or are under-utilized based on actual traffic between components of the optical network. The methods and systems described herein also provide efficient mechanisms for aiding data centers suffering from failures such as power outages or network difficulties. In such instances where disaster recovery is required, the optical wavelength allocation feature described herein can provide efficient and dynamic bandwidth allocation solutions for data centers, software vendors, or other entities that have an unexpected event which causes a massive surge in bandwidth requirements.

FIG. 1 depicts a workflow for an optical wavelength allocation feature, in accordance with at least one embodiment. The workflow 100 of FIG. 1 depicts a circuit bandwidth collector 102 transmitting a bandwidth request 104 to network controller 106. In accordance with at least one embodiment, the circuit bandwidth collector 102 may obtain, track, or otherwise receive router port and bandwidth usage of routers in an optical network. In embodiments, the circuit bandwidth collector 102 may provide a bandwidth request 104 to the network controller 106 when a given bandwidth capacity between one or more routers in the optical network reaches a certain threshold (e.g., 90% capacity). It should be noted that although the workflow 100 does not depict the circuit bandwidth collector 102 in communication with one or more routers or router groups of the optical network, in embodiments the optical wavelength allocation feature and associated optical network includes communication between the circuit bandwidth collector 102 and the routers or router groups of the optical network. The workflow 100 depicts the network controller making several requests to the CDC node controller 108 and the router controller 110 in response to receiving the bandwidth request 104 from the circuit bandwidth collector 102.

The workflow 100 depicts the network controller 106 transmitting a request for optical path 112 to the CDC node controller 108 and a request for router port 114 to the router controller 110. In accordance with at least one embodiment, the CDC node controller 108 is configured to identify, in response to the request for optical path 112, an available optical path between the routers requesting the additional bandwidth (bandwidth request 104) as well as an available optical wavelength to utilize by associated optical transponders of the routers. In embodiments, the available optical wavelength is selected such that it remains free throughout multiple segments of the data fiber available to the optical network. In accordance with at least one embodiment, the router controller 110 is configured to identify, in response to the request for router port 114, an available router port with the optical transponder for use in generating the optical path. The workflow 100 depicts the CDC node controller 108 transmitting the available optical path 116 to the network controller 106 and, the router controller 110 transmitting the available router port 118 to the network controller 106.

The workflow 100 of FIG. 1 depicts a decision at 120 which determines whether an available optical path and router port are available to generate an end to end channel between the routers requesting the additional bandwidth (bandwidth request 104). In accordance with at least one embodiment, the network controller 106 determines 120 if an available optical path and router port are available based on the responses 116 and 118 provided by the CDC node controller 108 and router controller 110. In embodiments, if either an available optical path 116 (which includes optical transponders and wavelengths) or a router port 118 are unavailable, the network controller 106 determines 120 that no 122 an optical path and router port are unavailable to generate an end to end channel. In such cases, the network controller 106 may generate and transmit a message 124 to a user device, the circuit bandwidth collector 102, or other application that no available optical path, wavelength, or router port is available to generate the end to end channel. In embodiments, if the available optical path and router port are available (yes 126), the network controller 106 may generate and transmit a message (not pictured) to a user device, the circuit bandwidth collector 102, or other application that an available optical path, wavelength, and router port is available to generate the end to end channel. In cases where the optical path, wavelength, or router port is unavailable, the circuit bandwidth collector 102 may attempt another request 104 at periodic intervals.

The workflow 100 also depicts the network controller 106 determining that the available optical path and router port 120 are available 126. In cases where the determination 120 is a yes 126, the network controller may transmit instructions (configuration instructions 128), via optical transponder controller 130 and IP information 132 to router controller 110 to configure the optical transponders 134 and 136 as well as the routers 138 and 140 to form the end to end channel in the optical network. In embodiments, the optical transponder controller 130 configures the optical transponders 134 and 136 to utilize the wavelength (116) from the CDC node controller in response to instructions from the network controller 106. In accordance with at least one embodiment, the router controller 110 configures the routers 138 and 140 to utilize the IP information 132 derived from the router port 118 in response to instructions from the network controller 106.

Figure 2:
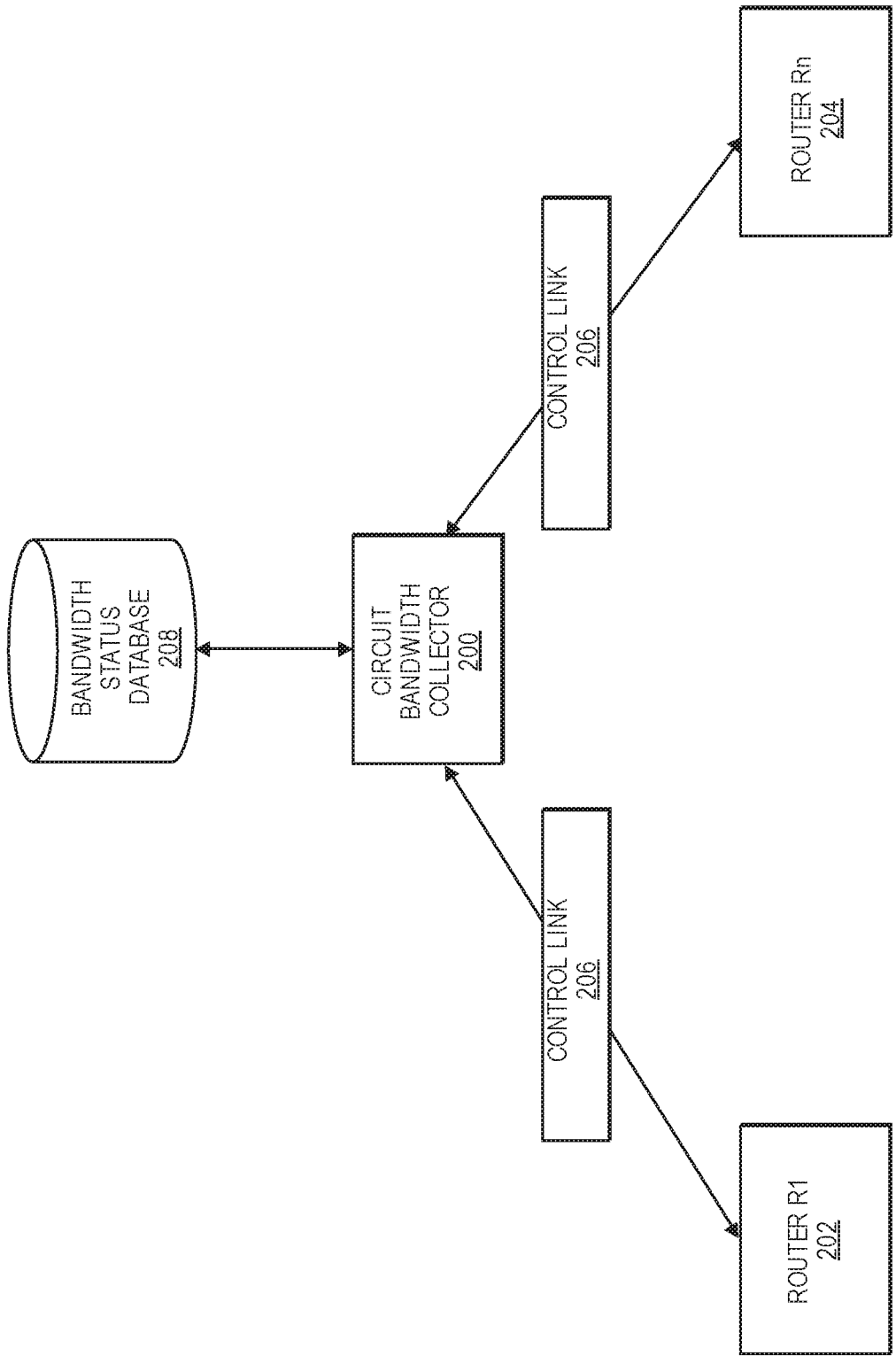
FIG. 2 depicts example components for a circuit bandwidth collector of an optical wavelength allocation feature, in accordance with at least one embodiment.

FIG. 2 depicts example components for a circuit bandwidth collector of an optical wavelength allocation feature, in accordance with at least one embodiment. FIG. 2 includes circuit bandwidth collector 200 in communication with one or more routers (router R1 202 and router Rn 204) via control links 206. It should be noted that although only two routers are illustrated in FIG. 2, the circuit bandwidth collector 200 may be in communication with a plurality of routers in the optical network simultaneously. In embodiments, the circuit bandwidth collector 200 is in communication with bandwidth status database 208. In accordance with at least one embodiment, the circuit bandwidth collector 200 collects or obtains bandwidth statistics (usage) from all router ports connected to the optical network via the optical transponders of the optical network. In embodiments, the circuit bandwidth collector 200 stores the bandwidth statistics in bandwidth status database 208. The bandwidth status database 208 may maintain router ports and bandwidth utilization per router port group in the optical network. In embodiments, the circuit bandwidth collector 200 obtains the bandwidth statistics or data from routers 202 and 204 using a simple network management protocol (SNMP) or streaming telemetry. As described herein, the circuit bandwidth collector 200 may be configured to transmit a bandwidth request upon the bandwidth data or statistics exceeding a certain threshold.

Figure 3:
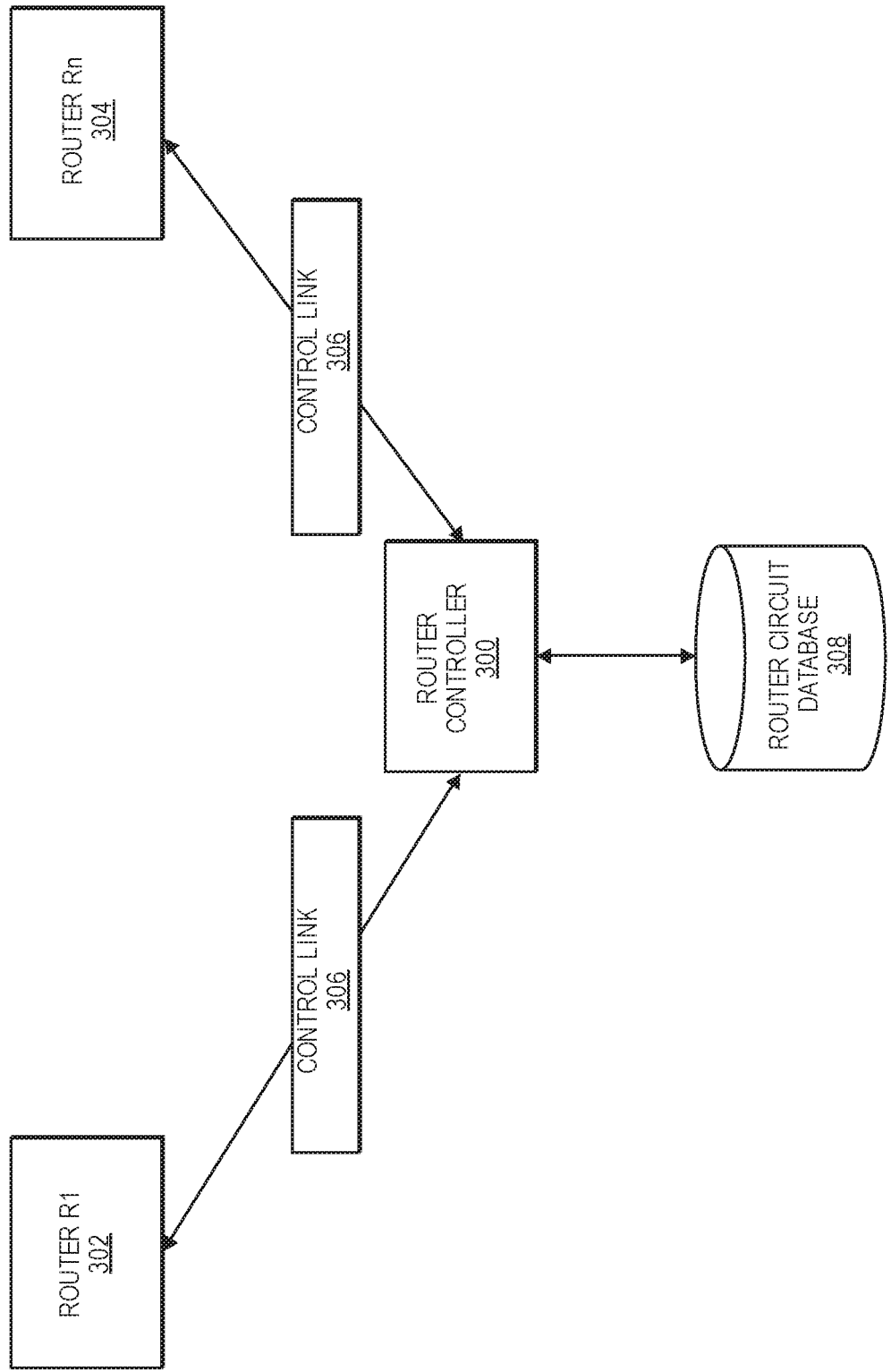
FIG. 3 depicts example components for a router controller of an optical wavelength allocation feature, in accordance with at least one embodiment.

FIG. 3 depicts example components for a router controller of an optical wavelength allocation feature, in accordance with at least one embodiment. FIG. 3 includes router controller 300 in communication with one or more routers (router R1 302 and router Rn 304) via control links 306. It should be noted that although only two routers are illustrated in FIG. 3, the router controller 300 may be in communication with a plurality of routers in the optical network simultaneously. In embodiments, the router controller 300 is in communication with router circuit database 308. In accordance with at least one embodiment, when the network controller system receives a bandwidth request for a router or router port group, the router controller 300 identifies an available router port and associated optical transponder to resolve the bandwidth request.

In accordance with at least one embodiment, the router controller 300 may configure the routers (302 and 304) associated with the bandwidth request to utilize particular internet protocol (IP) address information as well as router group information or router port group information. In embodiments, the network controller system determines, via the CDC node controller, whether an available optical path and optical wavelength are available prior to instructing the router controller 300 to provision router ports for routers 302 and 304. In embodiments, the router controller 300 determines that the router ports for routers 302 and 304 are connected to the appropriate optical transponders in the optical network. In embodiments, the router controller 300 may maintain information about router ports and associated optical transponders in the router circuit database.

Figure 4:
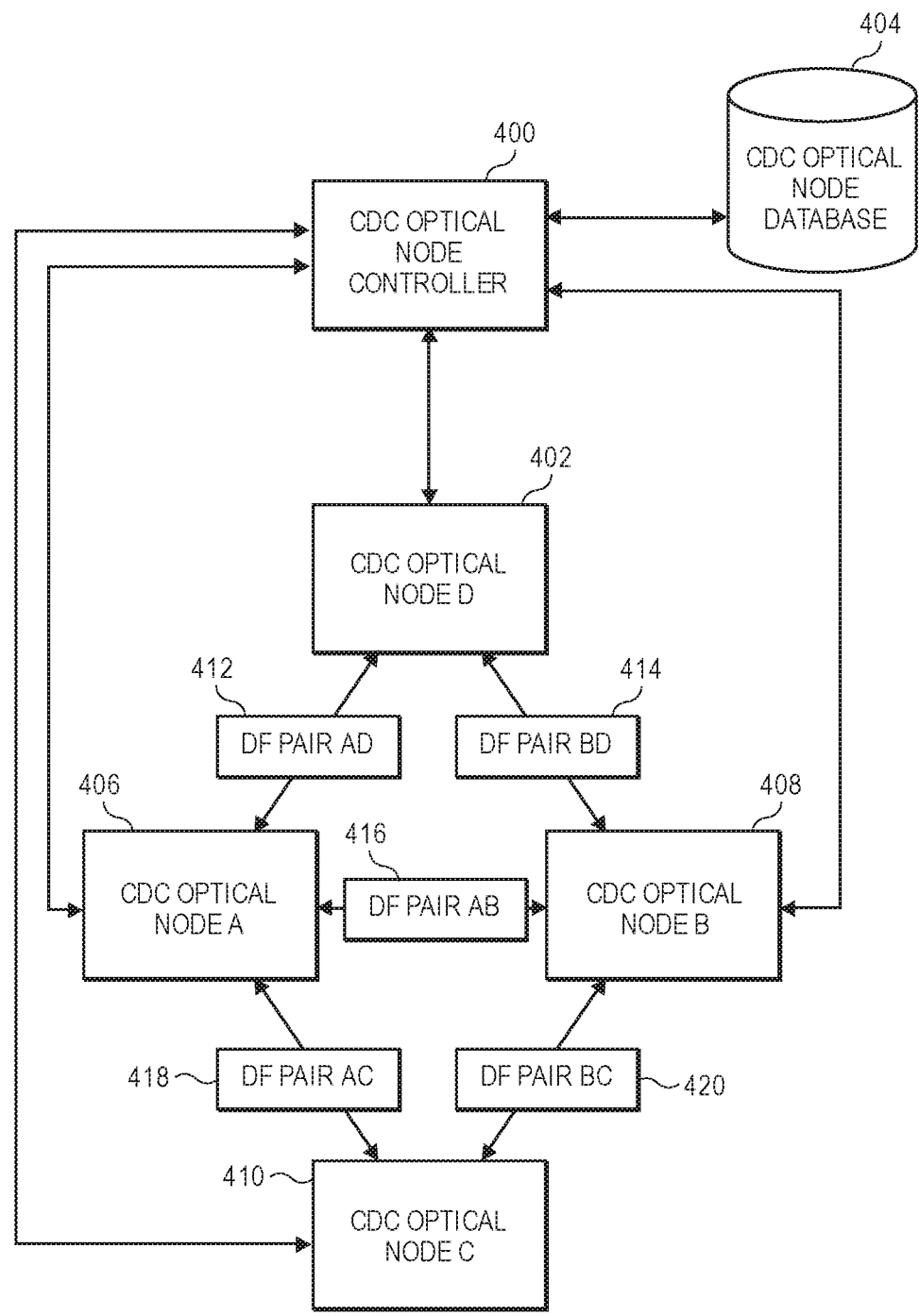
FIG. 4 depicts example components for a colorless-directionless-contentionless (CDC) optical node controller of an optical wavelength allocation feature, in accordance with at least one embodiment.

FIG. 4 depicts example components for a colorless-directionless-contentionless (CDC) optical node controller of an optical wavelength allocation feature, in accordance with at least one embodiment. FIG. 4 includes CDC optical node controller 400 in communication with a CDC optical node 402 (CDC optical node D) as well as CDC optical node database 404. Although FIG. 4 illustrates the CDC optical node controller 400 in communication with a single CDC optical node 402, embodiments described herein include implementations where the CDC optical node controller 400 is in communication with a plurality of CDC optical nodes of an optical network. FIG. 4 also includes other CDC optical nodes 406, 408, and 410 of the optical network that are connected via dark-fiber pairs 412-420. In embodiments, the dark-fiber pairs 412-420 may include two fiber strands where one fiber strand is utilized for transmitting while the other fiber strand is utilized for receiving data in the optical network. In accordance with at least one embodiment, the connection between any given CDC optical nodes (e.g., between CDC optical Nodes 402, 406, 408, and 410) utilizes a dark fiber pair (e.g., 412-420). In embodiments, the network controller is configured to communicate with a variety of vendor specific CDC optical node controllers and/or CDC optical nodes (402, 406, 408, and 410) thereby enabling communication between components of an optical network that were limited by vendor specific communication channels and messaging protocols.

In accordance with at least one embodiment, the CDC optical node controller 400 is configured to maintain a topology of the optical network and available wavelengths. The CDC optical node controller 400 may store the topology and available wavelengths in CDC optical node database 404. In embodiments, the CDC optical node controller 400 is configured to determine an available optical path and particular optical wavelength to utilize in generating the end to end channel between routers requesting additional bandwidth. As the term is used herein, unless contradicted by context, referencing a "particular wavelength" or wavelengths may also reference standardized spectrum bandwidth(s) centered on the particular wavelength(s), so that allocating a particular wavelength may allocate the standardized spectrum bandwidth centered on the particular wavelength and vice versa. The network controller may instruct the CDC optical node controller 400 to reserve the optical wavelength and provision the optical path if an available router port is determined by the router controller 300. The network controller may instruct the CDC optical node controller 400 or other components of the optical network using application programming interface (API) calls. In embodiments, the CDC optical nodes 402, 406, 408, and 410 may include a reconfigurable optical add-drop multiplexer (ROADM) device for adding, blocking, passing, or redirecting infrared and visible light beams of various wavelengths in the optical network.

Figure 5:
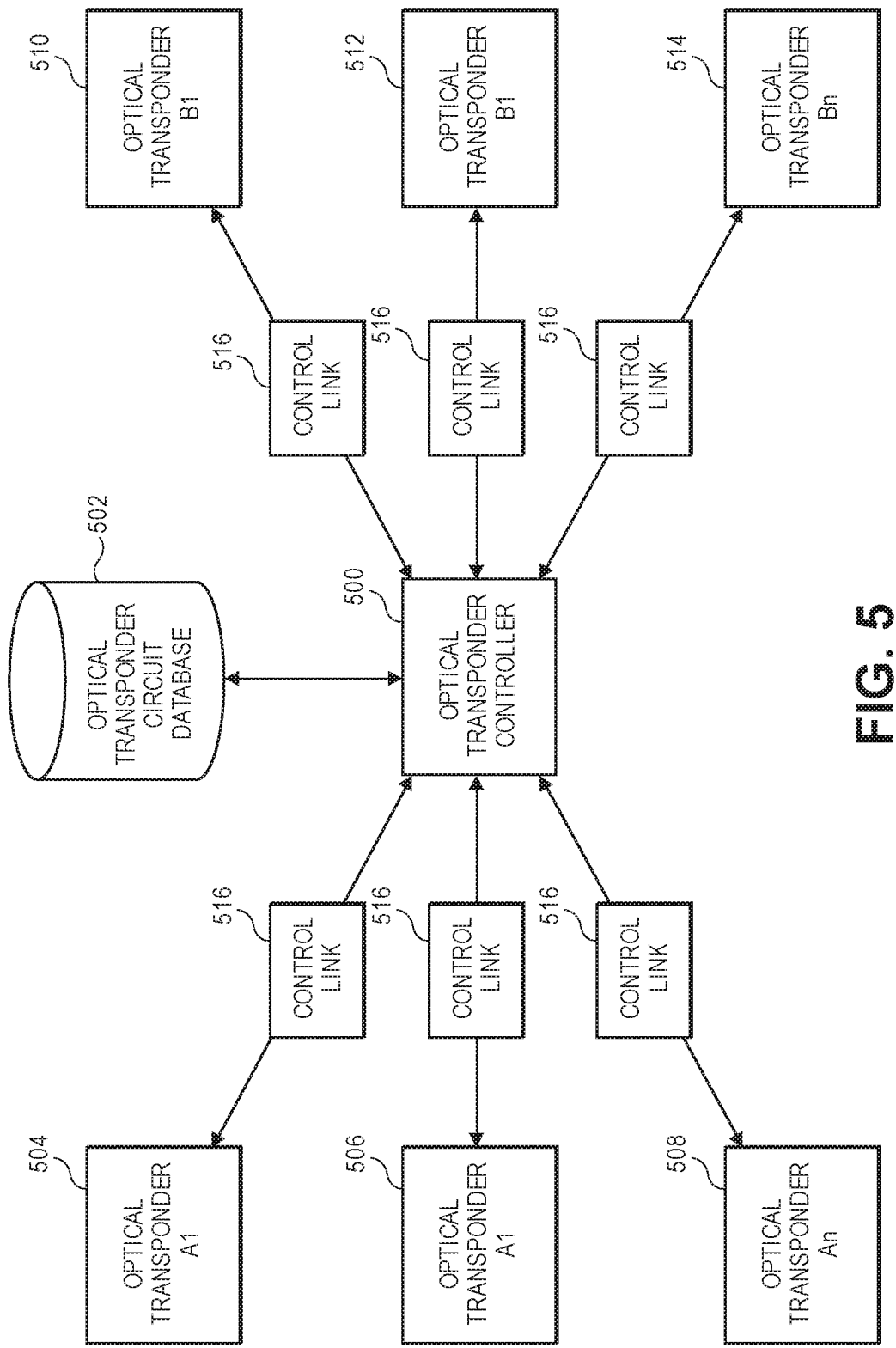
FIG. 5 depicts example components for an optical transponder controller of an optical wavelength allocation feature, in accordance with at least one embodiment.

FIG. 5 depicts example components for an optical transponder controller of an optical wavelength allocation feature, in accordance with at least one embodiment. FIG. 5 includes optical transponder controller 500 in communication with an optical transponder circuit database 502 as well as a plurality of optical transponders 504-514 via control links 516. In embodiments, the optical transponder controller 500 may be instructed, via the network controller, to configure a target (particular) wavelength on to an optical transponder (e.g., 504) in the optical network. The optical transponder controller 500 may maintain or obtain information from the optical transponders 504-514 to determine which optical transponder is connected to which router port in the optical network.

In accordance with at least one embodiment, the optical transponder controller 500 may be configured to maintain information which tracks that a given optical transponder in the optical network is connected to the correct remote optical transponder through the use of trial trace identifier (TTI) executions. In embodiments, the optical transponder controller 500 may be configured to maintain information that indicates optical performance levels of the optical transponders 504-514 of the optical network. For example, the information about the optical performance levels may include optical light levels, Q-Factor, CD, or PMD. In accordance with at least one embodiment, the optical transponder controller 500 may maintain and update the information about the optical transponders 504-514 in optical transponder circuit database 502. In embodiments, the information about the optical performance levels of the optical transponders 504-514 may be utilized by the network controller system to determine a health or overall status of an optical transponder. Based on the optical performance levels of the optical transponders 504-514, the network controller system may generate and transmit a message to an network administrator to replace a particular optical transponder in the optical network. In some embodiments, an under-performing or malfunctioning optical transponder may result in the network controller system from generating an alternative optical path by communicating with the CDC node controller 400 to avoid using a particular optical transponder in the optical network.

Figure 6:
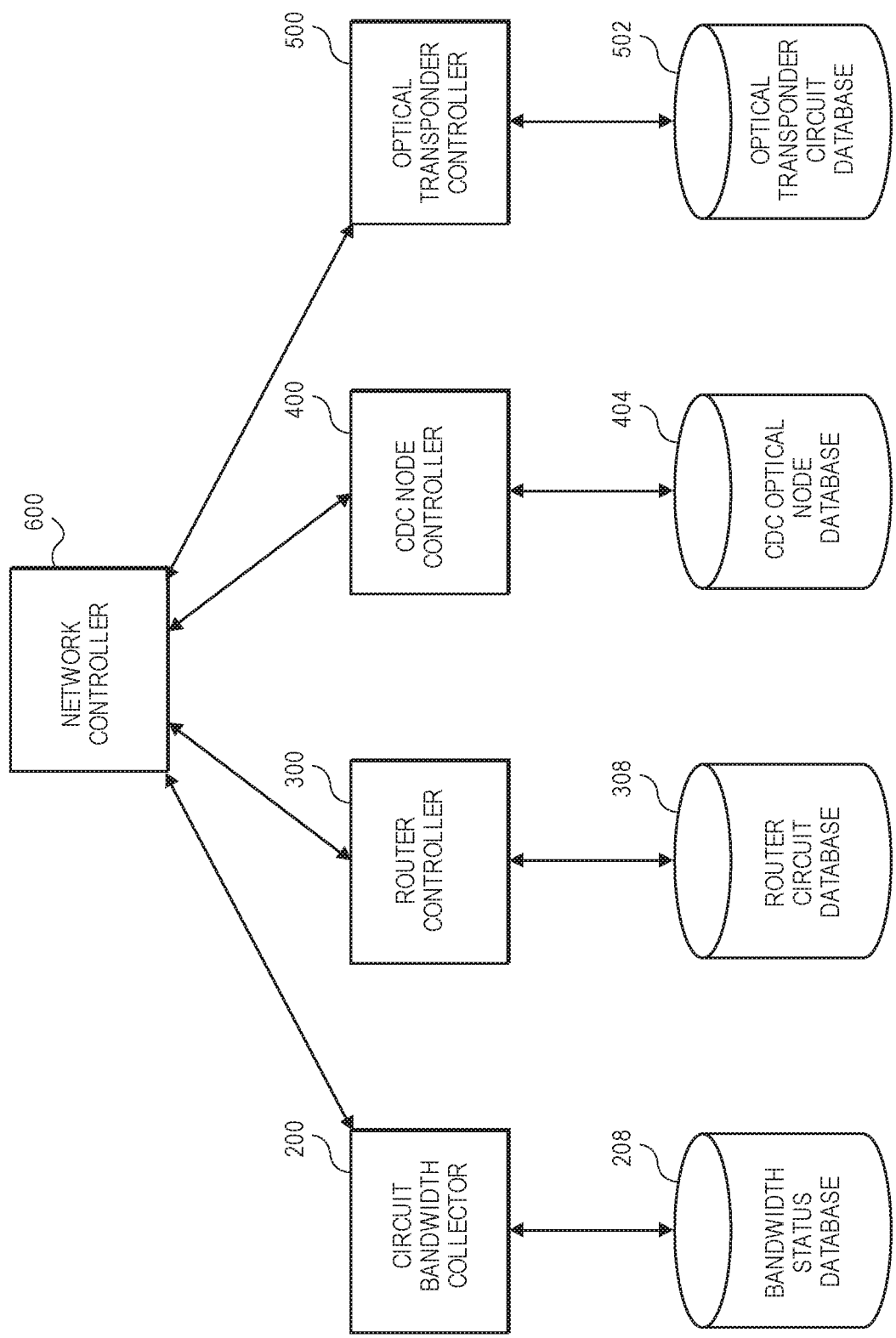
FIG. 6 depicts example components in communication with an optical wavelength allocation feature that includes a network controller, in accordance with at least one embodiment.

FIG. 6 depicts components in communication of an optical wavelength allocation feature that includes a network controller, in accordance with at least one embodiment. FIG. 6 illustrates network controller (network controller system) 600 in communication with circuit bandwidth collector 200, router controller 300, CDC node controller 400, and optical transponder controller 500. As described herein, the network controller 600 may receive a bandwidth request from circuit bandwidth collector 200 and request an available router and router port information from router controller 300. The network controller 600 may request an optical path and a particular wavelength from CDC node controller 400 and instruct the optical transponder controller 500 to utilize the particular wavelength for configuring the associated optical transponders to generate an end to end channel in the optical network and, thereby generate additional bandwidth for routers associated with the bandwidth request.

In embodiments, the network controller 600 binds and centralizes operations of the circuit bandwidth collector 200, router controller 300, CDC node controller 400, and optical transponder controller 500 to generate and provision optical paths to provide additional bandwidth capacity for routers in an optical network. In accordance with at least one embodiment, the network controller 600 may maintain one or more policies that indicate a number of CDC optical nodes that can be utilized in generating the optical path by the CDC node controller 400 in response to a bandwidth request. For example, a policy of the one or more policies may indicate that when the bandwidth capacity for the requesting routers is above a certain percentage then no more than two CDC optical nodes may be utilized to generate an optical path. As another illustrative example, another policy may indicate that as many as four CDC optical nodes may be utilized to generate the optical path.

Figure 7:
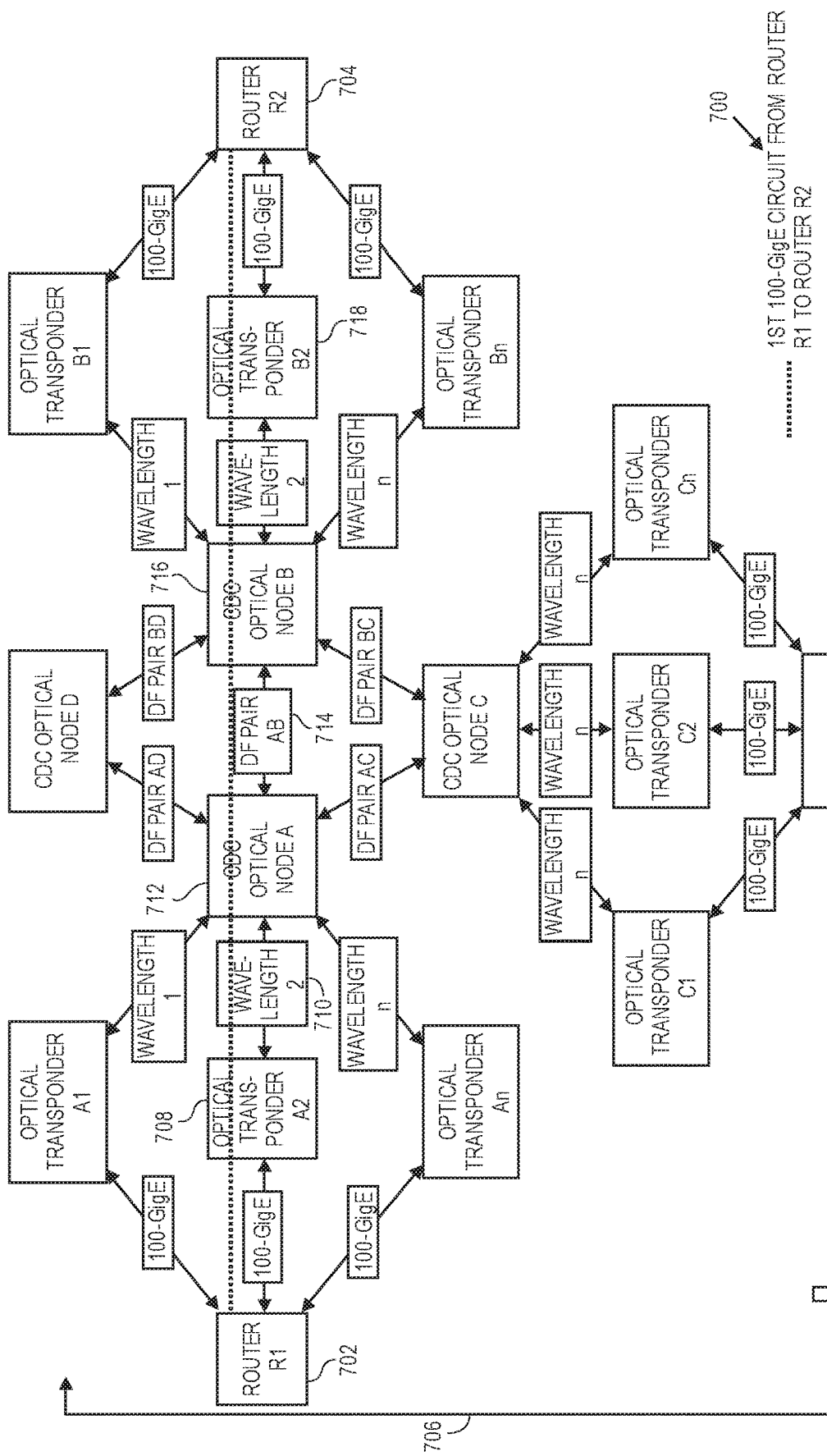
FIG. 7 depicts an example optical path forming an end to end channel between router components in an optical network for an optical wavelength allocation feature, in accordance with at least one embodiment.

FIG. 7 depicts an example optical path forming an end to end channel between router components in an optical network for an optical wavelength allocation feature, in accordance with at least one embodiment. FIG. 7 includes an optical path 700 (depicted as a first dashed line in FIG. 7) implemented between router R1 702 and router R2 704 in optical network 706. The optical path 700 transports data via optical transponder A2 708 using wavelength 2 710, via CDC optical node A 712 and DF pair AB 714 to CDC optical Node B 716 which includes router R2 704. In embodiments, a CDC optical node or optical node such as CDC optical Node A 712 includes one or more transponders (708) configured to utilize one or more wavelengths (710) to transport data from one or more routers or router groups such as router R1 702 across the optical network to other CDC optical nodes (e.g., CDC optical Node B 716). FIG. 7 depicts the optical path 700 transporting data from router R1 702 to Router R2 704 via optical transponder B2 718. It should be noted that although FIG. 7 depicts a limited number of routers, optical transponders, and available wavelengths, the optical wavelength allocation feature embodiments include configurations that utilize more or less components in an optical network for dynamically allocating and provisioning optical paths in response to bandwidth requests from routers in the optical network. In embodiments, the optical transponders can select a wavelength from a set of candidate wavelengths as well as send and receive an optical signal from a fiber by converting a full-duplex electrical signal in a full-duplex optical signal. In embodiments, the CDC optical nodes and routers don't currently have the same capabilities as the optical transponders although future advances in technology may be such that alternative embodiments of the current disclosure include the capabilities of the transponders being incorporated into the routers and/or CDC optical nodes. As an illustrative use case for the optical wavelength allocation feature described herein, the optical path 700 of FIG. 7 may reach a certain bandwidth usage (e.g., 90%) that results in an associated network controller system receiving a bandwidth request from a circuit bandwidth collector in communication with router R1 702 and router R2 704. The dynamic provisioning of another optical path between these two routers is described below with reference to FIG. 8.

Figure 8:
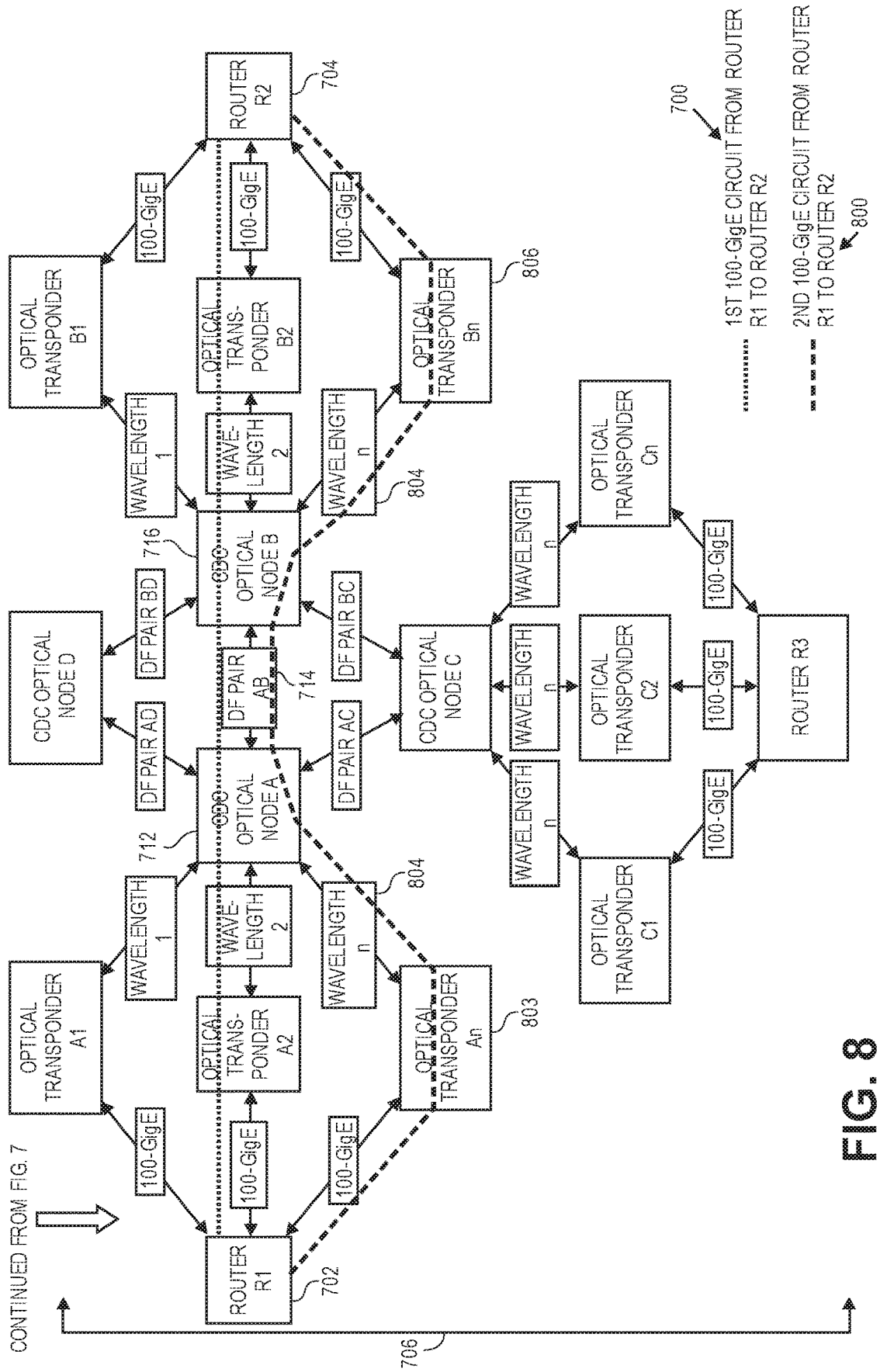
FIG. 8 depicts an example additional optical path generated by the optical wavelength allocation feature to form an end to end channel between router components in an optical network in response to a bandwidth request, in accordance with at least one embodiment.

FIG. 8 depicts an additional optical path generated by the optical wavelength allocation feature to form an end to end channel between router components in an optical network in response to a bandwidth request, in accordance with at least one embodiment. FIG. 8 depicts the generation of another optical path 800 (depicted as a dashed line that is different from dashed line 700 of FIG. 7) to provide additional bandwidth between router R1 702 and router R2 704. In FIG. 8, the network controller system may have received the bandwidth request from the circuit bandwidth collector and request and obtain router port information, IP address information, and optical transponder information from a router controller of the optical network for CDC optical node A 712 and CDC optical node B 716.

The network controller may also request and obtain, from the CDC node controller, an optical network path and a particular wavelength to utilize in generating the other optical path 800. For example, the CDC node controller may identify that optical transponder An 802 and wavelength n 804 as well as corresponding optical transponder Bn 806 can be utilized to generate the other optical path 800 between router R1 702 and router R2 704. In response to obtaining the information from the router controller and the CDC node controller, the network controller system may instruct an optical transponder controller to configure optical transponder An 802 and optical transponder Bn 806 to utilize the particular wavelength identified by the CDC node controller. In embodiments, the network controller system may instruct the router controller to configure router ports of router R1 702 and router R2 704 to utilize the IP address information and router port information thereby generating the other optical path 800 and provisioning an end to end channel in the optical network to connect and transmit data between router R1 702 and router R2 704. As illustrated in FIG. 8, each additional optical path is capable of supporting a 100 Gigabit/s capacity. It should be noted that although FIGS. 7 and 8 depict optical fiber lines with a 100 Gigabit/s capacity, optical fiber lines with more or less capacity may be utilized to implement the embodiments of the optical wavelength allocation feature described herein.

Figure 9:
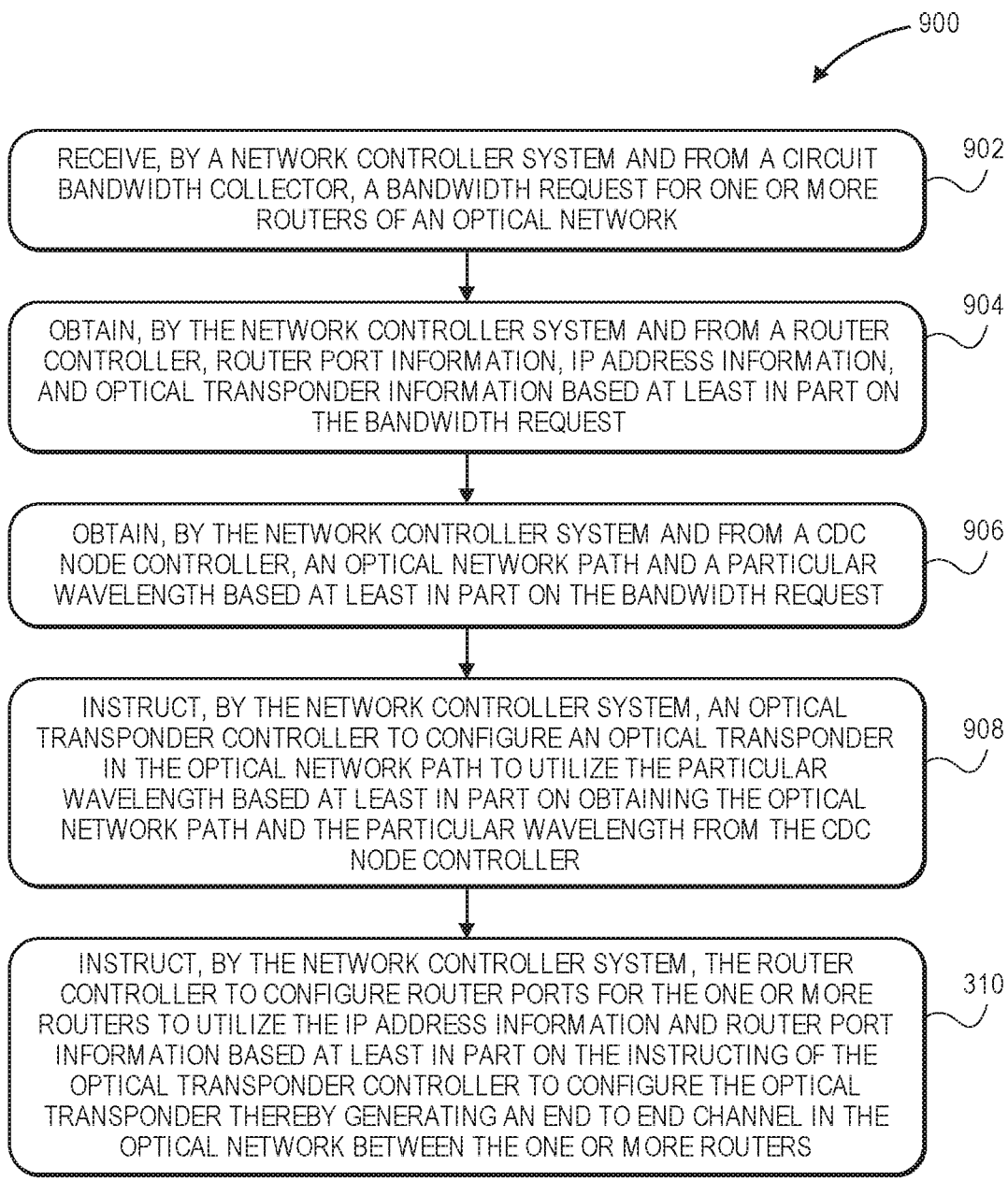
FIG. 9 depicts an example flow diagram for an optical wavelength allocation feature, in accordance with at least one embodiment.
Figure 10:
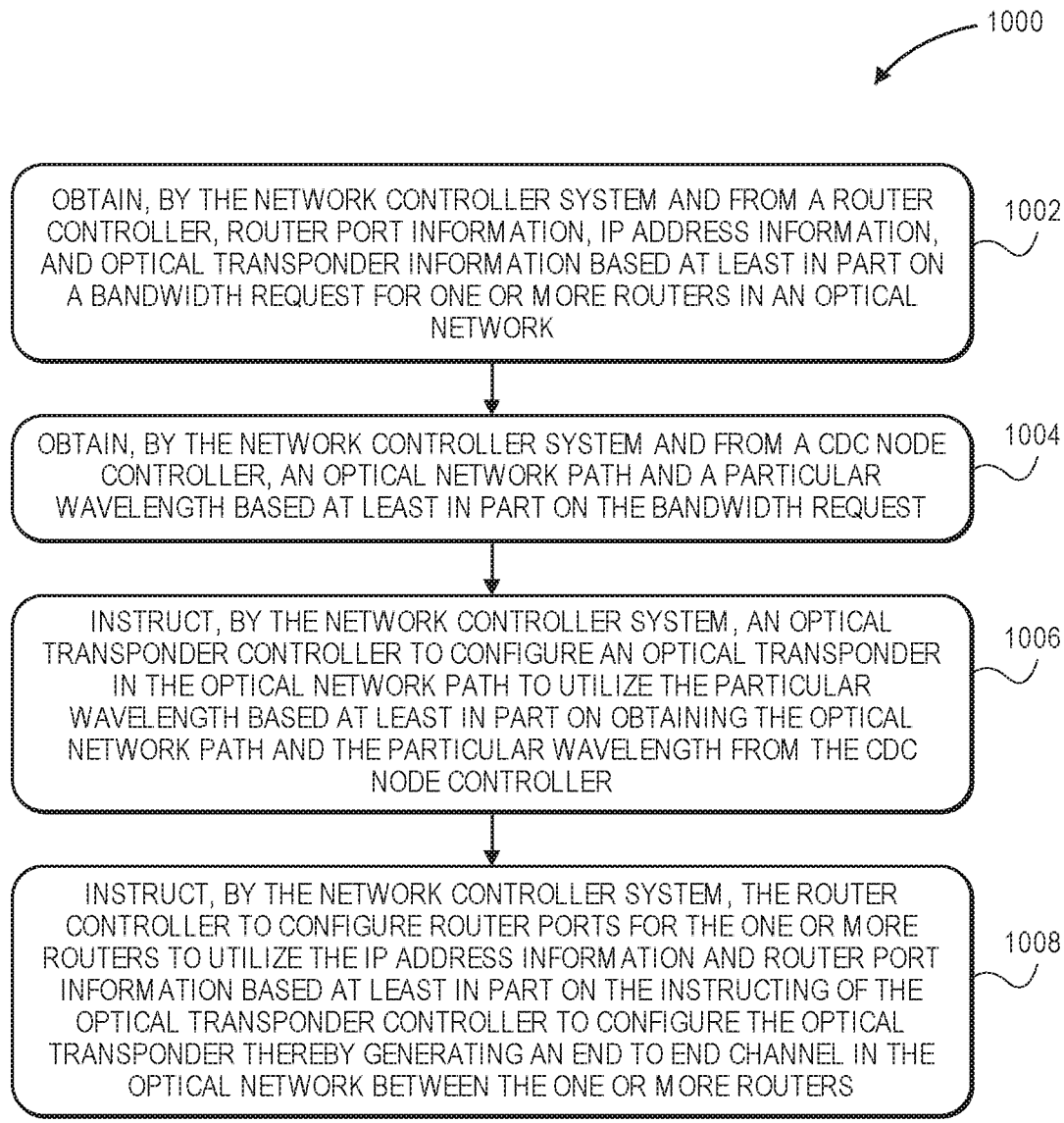
FIG. 10 depicts an example flow diagram for an optical wavelength allocation feature, in accordance with at least one embodiment.

FIGS. 9 and 10 illustrate example flows for an optical wavelength allocation feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored in a computer-readable storage medium, for example, in the form of a computer program including a plurality of instructions executable by one or more processors. The computer-readable storage medium may be non-transitory.

In some examples, the network controller (network controller system) 106, 600 (e.g., utilizing at least one of the circuit bandwidth collector (102 and 200), the router controller (110 and 300), the CDC optical node controller (108 and 400), and the optical transponder controller (130 and 500)) shown in FIGS. 1-6 may perform the processes 900 and 1000 of FIGS. 9 and 10. The process 900 may include receiving, by a network controller system and from a circuit bandwidth collector, a bandwidth request for one or more routers of an optical network at 902. In accordance with at least one embodiment, the circuit bandwidth collector may obtain updated bandwidth information from one or more routers of the optical network. The updated bandwidth information may represent a decrease in bandwidth usage/requirement for one or more routers of the optical network which is different from the previously obtained increased bandwidth usage/requirement for the same one or more routers of the optical network. In embodiments, the network controller may use the updated bandwidth information to dynamically release or otherwise deallocate the resources in the optical network to be utilized to satisfy other bandwidth requests in the optical network. In accordance with at least one embodiment, the network controller system may instruct an optical transponder, via the optical transponder controller, to release a particular wavelength for the optical transponder based at least in part on the updated bandwidth information.

The process 900 may include obtaining, by the network controller system and from a router controller, router port information, IP address information, and optical transponder information based at least in part on the bandwidth request at 904. The process 900 may include obtaining, by the network controller system and from a CDC node controller, an optical network path and a particular wavelength based at least in part on the bandwidth request at 906. In accordance with at least one embodiment, the network controller system may generate a message indicating that an optical network path is unavailable for a bandwidth request based at least in part on information from the CDC node controller about potential optical network paths and potential wavelengths to utilize by associated optical transponders of the one or more routers.

The process 900 may include instructing, by the network controller system, an optical transponder controller to configure an optical transponder in the optical network path to utilize the particular wavelength based at least in part on obtaining the optical network path and the particular wavelength from the CDC node controller at 908. In embodiments, the network controller system may instruct the optical transponder, via the optical transponder controller, to utilize a particular launch power for the particular wavelength. In embodiments, the process 900 may include instructing, by the network controller system, the router controller to configure router ports for the one or more routers to utilize the IP address information and the router port information based at least in part on the instructing of the optical transponder controller to configure the optical transponder at 910. The instructing of the optical transponder controller and the router controller may generate an end to end chancel in the optical network between the one or more routers which can serve to alleviate the increased bandwidth request between the one or more routers.

The process 1000 may include obtaining, by the network controller system and from a router controller, router port information, IP address information, and optical transponder information based at least in part on the bandwidth request for one or more routers in an optical network at 1002. In embodiments, the bandwidth request may be provided by a circuit bandwidth collector to the network controller system. In accordance with at least one embodiment, the circuit bandwidth collector obtains usage statistics from a plurality of router ports of a plurality of routers of the optical network. The circuit bandwidth collector may maintain one or more bandwidth thresholds. The bandwidth thresholds may represent network usage or bandwidth requirements prior to a request being made to the network controller system to identify and generate a new optical path between routers of the optical network to service an increase in bandwidth usage between the routers. In accordance with at least one embodiment, the bandwidth request is provided by the circuit bandwidth collector to the network controller system based at least in part on current usage statistics from the plurality of router ports and the one or more thresholds. For example, the current usage statistics may need to exceed one or more of the bandwidth thresholds before a bandwidth request is generated and transmitted to the network controller system.

The process 1000 may include obtaining, by the network controller system and from a CDC node controller, an optical network path and a particular wavelength based at least in part on the bandwidth request at 1004. The process 1000 may include instructing, by the network controller system, an optical transponder controller to configure an optical transponder in the optical network path to utilize the particular wavelength based at least in part on obtaining the optical network path and the particular wavelength from the CDC node controller at 1006. In embodiments, the optical transponder controller may maintain information that identifies which optical transponders are connected to which router ports of the optical network. The optical transponder controller may obtain such information using a trial trace identifier (TTI). In embodiments, the optical transponder controller maintains optical performance level information of the optical transponders of the optical network. The optical performance level information may be utilized by the network controller system to identify underperforming optical transponders that may need to be repaired or at least avoided when generating an optical path to service subsequent bandwidth requests. The process 1000 may include instructing, by the network controller system, the router controller to configure router ports for the one or more routers to utilize the IP address information and router port information based at least in part on the instructing of the optical transponder controller to configure the optical transponder. The instructing of the optical transponder controller and the router controller may generate an end to end chancel in the optical network between the one or more routers which can serve to alleviate the increased bandwidth request between the one or more routers.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect of the disclosure. For example, the data store illustrated includes mechanisms for storing bandwidth status data 1112 and optical transponder circuit data 1116, which can be used to serve content for the production side as well as implement features of the optical wavelength allocation feature described herein. For example, the bandwidth status data 1112 may include collected or obtained bandwidth statistics from all router ports connected or utilized by the CDC optical network via optical transponders. The optical transponder circuit data 1116 may include information that identifies which optical transponder is connected to which router port as well as optical performance levels of the optical transponders. The data store 1110 also is shown to include a mechanism for router circuit data 1114, which can be used for reporting, analysis, or other such purposes such as identifying available router ports with associated optical transponders in the optical network. The data store 1110 is depicted to include a CDC optical node database 1118 which can be used to maintain and update a topology of an optical network or a CDC optical network as well as available wavelengths for provisioning to an optical transponder controller as described herein. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, IBM®, Druid (Open Source), and Graphite (Open Source).

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a network controller system from a circuit bandwidth collector, a bandwidth request for one or more routers of an optical network;
obtaining, by the network controller system and from a router controller, router port information and optical transponder information based at least in part on the bandwidth request;
obtaining, by the network controller system and from a colorless-directionless-contentionless (CDC) node controller, an optical network path and a particular wavelength based at least in part on the bandwidth request;
instructing, by the network controller system, an optical transponder controller to configure an optical transponder in the optical network path to utilize the particular wavelength based at least in part on obtaining the optical network path and the particular wavelength from the CDC node controller; and
instructing, by the network controller system, the router controller to configure router ports for the one or more routers to utilize the router port information based at least in part on the instructing of the optical transponder controller to configure the optical transponder thereby generating an end to end channel in the optical network between the one or more routers.

2. The computer-implemented method of claim 1, further comprising instructing, by the network controller system, the optical transponder, via the optical transponder controller, to utilize a particular launch power for the particular wavelength.

3. The computer-implemented method of claim 1, further comprising receiving, by the network controller system and from the circuit bandwidth collector, updated bandwidth information for the one or more routers of the optical network.

4. The computer-implemented method of claim 3, further comprising instructing, by the network controller system, the optical transponder, via the optical transponder controller, release of the particular wavelength for the optical transponder in the optical network path based at least in part on the updated bandwidth information.

5. The computer-implemented method of claim 1, further comprising generating, by the network controller system, a message that indicates that the optical network path is unavailable for the bandwidth request based at least in part on information from the CDC node controller about potential optical network paths and potential wavelengths to utilize by associated optical transponders of the one or more routers.

6. A computer-implemented method, comprising:
 obtaining, by a network controller system and from a router controller, router port information and optical transponder information based at least in part on a bandwidth request for one or more routers in an optical network;
 obtaining, by the network controller system and from a colorless-directionless-contentionless (CDC) node controller, an optical network path and a particular wavelength based at least in part on the bandwidth request;
 instructing, by the network controller system, an optical transponder controller to configure an optical transponder in the optical network path to utilize the particular wavelength based at least in part on obtaining the optical network path and the particular wavelength from the CDC node controller; and
 instructing, by the network controller system, the router controller to configure router ports for the one or more routers to utilize the router port information based at least in part on the instructing of the optical transponder controller to configure the optical transponder thereby generating an end to end channel in the optical network between the one or more routers.

7. The computer-implemented method of claim 6, wherein the bandwidth request is provided by a circuit bandwidth collector to the network controller system.

8. The computer-implemented method of claim 7, wherein the circuit bandwidth collector obtains usage statistics from a plurality of router ports of a plurality of routers of the optical network.

9. The computer-implemented method of claim 8, wherein the circuit bandwidth collector maintains one or more bandwidth thresholds.

10. The computer-implemented method of claim 9, wherein the bandwidth request is provided by the circuit bandwidth collector to the network controller system based at least in part on current usage statistics from the plurality of router ports and the one or more thresholds.

11. The computer-implemented method of claim 6, wherein the optical transponder controller maintains information that identifies which optical transponders are connected to which router ports of the optical network.

12. The computer-implemented method of claim 11, wherein the optical transponder controller obtains the information using a Trial Trace Identifier (TTI).

13. The computer-implemented method of claim 6, wherein the optical transponder controller maintains optical performance level information of optical transponders of the optical network.

14. A network controller system, comprising:
 a memory configured to store computer-executable instructions; and
 a processor in communication with the memory configured to execute the computer-executable instructions to at least:
 receive, from a circuit bandwidth controller, a bandwidth request for one or more routers of an optical network;
 obtain, from a router controller, router port information and optical transponder information based at least in part on the bandwidth request;
 obtain, from a colorless-directionless-contentionless (CDC) node controller, an optical network path and a particular wavelength based at least in part on the bandwidth request;
 instruct an optical transponder controller to configure an optical transponder in the optical network path to utilize the particular wavelength based at least in part on obtaining the optical network path and the particular wavelength from the CDC node controller; and
 instruct the router controller to configure router ports for the one or more routers to utilize the router port information based at least in part on the instructing of the optical transponder controller to configure the optical transponder thereby generating an end to end channel in the optical network between the one or more routers.

15. The network controller system of claim 14, wherein the processor is further configured to execute the computer-executable instructions to at least instruct the optical transponder, via the optical transponder controller, to utilize a particular launch power for the particular wavelength.

16. The network controller system of claim 14, wherein the processor is further configured to execute the computer-executable instructions to at least receive, from the circuit bandwidth collector, updated bandwidth information for the one or more routers of the optical network.

17. The network controller system of claim 16, wherein the processor is further configured to execute the computer-executable instructions to at least instruct the optical transponder, via the optical transponder controller, release of the particular wavelength for the optical transponder in the optical network path based at least in part on the updated bandwidth information.

18. The network controller system of claim 14, wherein the processor is further configured to execute the computer-executable instructions to at least generate a message that indicates that the optical network path is unavailable for the bandwidth request based at least in part on information from the CDC node controller about potential optical network paths and potential wavelengths to utilize by associated optical transponders of the one or more routers.

19. The network controller system of claim 14, wherein the bandwidth request is provided by a circuit bandwidth collector to the network controller system.

20. The network controller system of claim 19, wherein the circuit bandwidth collector obtains usage statistics from a plurality of router ports of a plurality of routers of the optical network.

* * * * *